United States Patent [19]

Cheng et al.

[11] 4,228,143

[45] Oct. 14, 1980

[54] METHOD OF PRODUCING PELLETED CARBON BLACK

[75] Inventors: Paul J. Cheng; King L. Mills, both of Bartlesville, Okla.

[73] Assignee: Phillips Petroleum Company, Bartlesville, Okla.

[21] Appl. No.: 880,243

[22] Filed: Feb. 22, 1978

[51] Int. Cl.$^2$ .................... C01B 31/00; C01B 31/02; C09C 1/56

[52] U.S. Cl. .................................. 423/445; 423/460; 423/461

[58] Field of Search ................ 423/445, 449, 460, 461

[56] References Cited

U.S. PATENT DOCUMENTS

| | | | |
|---|---|---|---|
| Re. 21,302 | 12/1939 | Grote | 423/460 |
| 2,908,586 | 10/1956 | Braendle | 106/307 |
| 2,952,921 | 9/1960 | Wood et al. | 34/36 |
| 2,973,249 | 2/1961 | Haas | 423/461 |
| 3,243,820 | 4/1966 | Melore et al. | 423/460 |
| 3,307,911 | 3/1967 | Krejci | 423/450 |
| 3,384,460 | 5/1968 | Latham | 423/460 |
| 3,401,020 | 9/1968 | Kester et al. | 423/450 |
| 3,844,809 | 10/1974 | Murray | 423/445 |
| 3,993,739 | 11/1976 | Vanderveen | 423/460 |

FOREIGN PATENT DOCUMENTS 118922  9/1944  Australia .................................. 423/461

*Primary Examiner*—Earl C. Thomas
*Assistant Examiner*—Gregory A. Heller

[57] ABSTRACT

Flocculent furnace carbon black is produced by contacting a feed hydrocarbon with hot combustion gases to pyrolyze the feed hydrocarbon. The hot combustion products produced by pyrolyzing include flocculent carbon black suspended in gases and are quenched to form a cooled effluent. The effluent is subjected to separation to separate the flocculent carbon black from the gases. The combustion products are cooled by quenching in a manner to maintain a photometer value of the flocculent carbon black in predetermined range such that when the separated flocculent carbon black is subsequently pelleted a minimum loss of modulus results in the rubber into which the pelleted carbon black is compounded. The flocculent carbon black is pelleted under prescribed pelleting conditions and is dried under prescribed drying conditions to help achieve minimum modulus loss in the end product.

2 Claims, 6 Drawing Figures

METHOD OF PRODUCING PELLETED CARBON BLACK

The present invention relates to a pelleted carbon black and method of producing the pelleted furnace carbon black.

The advantages of using pelleted carbon black in the compounding of rubber, for example, for use as a tire molding compound, is well known in the art. It has been found in the past that certain properties of carbon black are important in producing rubbers having given properties. Many advances have been made in defining types of carbon blacks and their properties. This has been most helpful in determining which types of carbon black and which carbon black properties are important to achieve a desired end product. Some of the more important carbon black properties are structure, tint, photolometer, iodine absorption number, pH, $N_2SA$, CTAB, etc. Most of these properties have ASTM tests for determining the values of these properties. These tests are:

| Property | ASTM |
|---|---|
| Structure (DBP) | D 2414-76 |
| 24M4 Structure (DBP) | D 3493-76 |
| Tint Strength | D 3265-76 |
| Photolometer | D 1618-75 |
| Iodine Number | D 1510-76 |
| pH | D 1512-75 |
| Nitrogen Surface Area, $N_2SA$, | D 3037-76 |
| CTAB | J. Janzen and G. Kraus, Rubber Chemistry and Technology, 44, 1287 (1971)-Not ASTM |

It has been found that the modulus value (ASTM D 412-75) of a rubber compounded with furnace carbon black can be predicted by selecting in particular, the photolometer value (ASTM D 1618-75) of the dry loose or flocculent carbon black.

Most tire companies require that the dried, pelleted carbon black compounded with a given rubber must result in the rubber compound having a specified 300 percent, 30 minute and 50 minute, modulus value, per ASTM D 412-75, for example, 100 psi above a certain control carbon black or reference carbon black used in that same rubber compound. It is therefore important that a dried pelleted carbon black be produced, using carbon black from a furnace carbon black process (e.g. as in U.S. Pat. No. 2,564,700) which is wet pelleted and dried so that the pellets of carbon black when compounded with rubber will effect a higher modulus value of the rubber product as compared with the modulus value of the rubber product compounded with the reference black. That is, the modulus value of the rubber product compounded with pelleted carbon black must be at least about 100 psi above the modulus value of the rubber product compounded with the reference carbon black.

It has been found that when dry loose or flocculent (unpelleted) furnace carbon black is subjected to wet pelleting and drying to produce dried pellets of carbon black there is always a lower modulus value (a loss in modulus) of the rubber product compounded with the dried pellets of carbon black as compared with the modulus value of the same rubber product compounded with the same but unpelleted dry carbon black.

It has also been found that the loss in modulus value can be reduced by operating the furnace carbon black reactor so that the produced dry loose or unpelleted carbon black has a photolometer value (ASTM D 1618-75) within a certain range of values.

The problem is presented that a carbon black must be produced which has the properties thereof within a range to produce a product having an acceptable modulus. It has been found that the product modulus, based on the use of unpelleted carbon black in the rubber compound, increases as a linear function of the increase of toluene photolometer value (ASTM D 1618-75). However, it has also been found that as the toluene photolometer value increased, the product modulus will first increase and then decrease when the carbon black used has been pelleted and dried. The increase in product modulus loss during pelleting and drying, that is, the difference between product modulus using unpelleted carbon black and the product modulus using pelleted, dried carbon black, is a function of the toluene photolometer value squared. Since these are opposing effects, the problem is to determine an optimmum toluene photolometer value for the unpelleted or flocculent carbon black which will result in a minimum of modulus loss when the dried pelleted carbon black is compounded with the rubber to make the product.

It is an object of the present invention to provide a process for producing a wet pelleted, dried furnace carbon black which when compounded with a rubber will maintain a rubber product modulus value of about 100 psi above the modulus value of the same rubber compounded with a standard or reference carbon black. It is an object of the invention to provide a method for reducing the loss of modulus value of the rubber product compounded with produced wet pelleted and dried furnace carbon black pellets compared to the rubber product compounded with dry loose furnace carbon black as recovered from the furnace. It is another object of the present invention to provide a method of producing wet pelleted, dried furnace carbon black pellets which when compounded with rubber will have product modulus loss minimized and which modulus loss can be predicted by evaluation of known or measured properties which can be easily and readily controlled in a commercial carbon black manufacturing operation. It is another object of the present invention to provide a method of producing dried pelleted carbon black which will result in a minimum of loss of product modulus. It is another object of the present invention to provide a method of producing carbon black pellets which can have product modulus loss minimized and predicted by evaluation of known properties which can be easily and readily controlled in commercial operation.

Other objects and advantages of the present invention will become apparent from the following description taken in connection with the accompanying drawings wherein are set forth by way of illustration and example certain embodiments of this invention.

Figure 1:
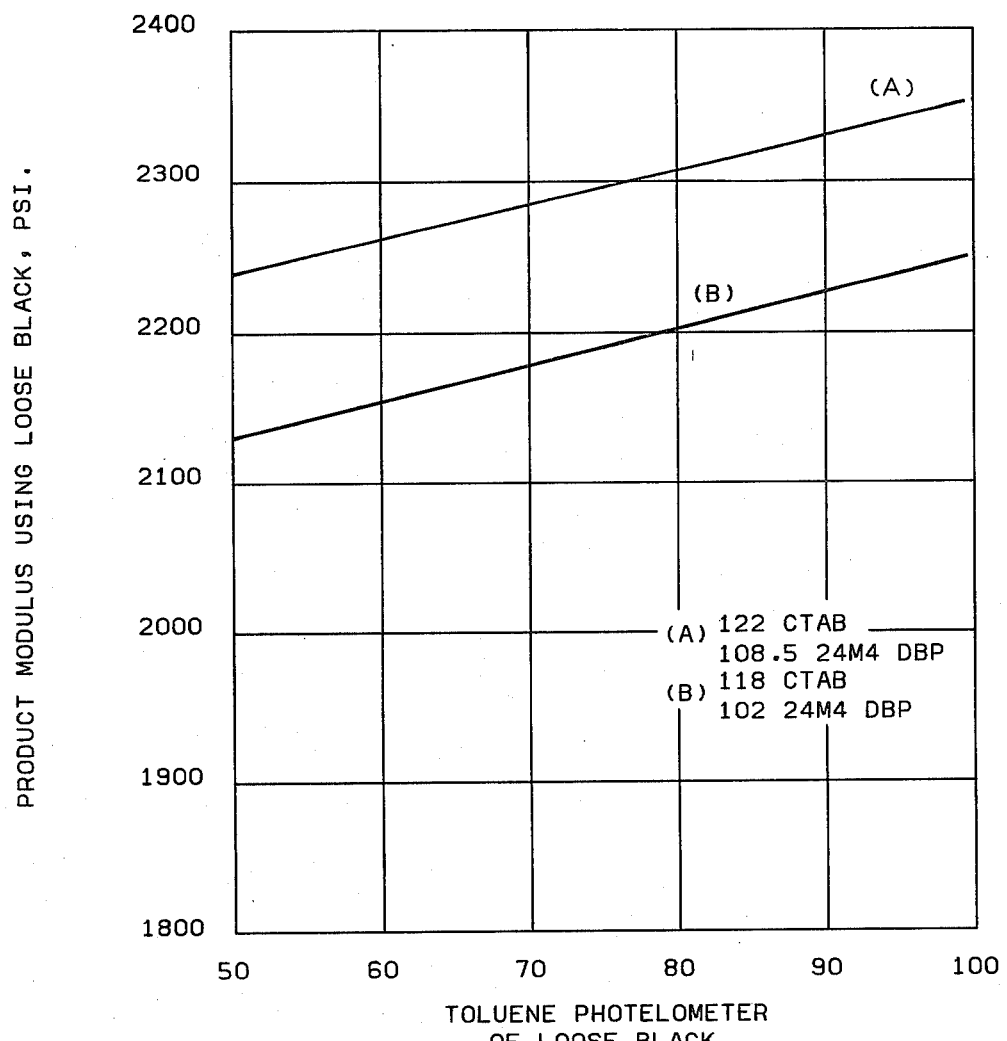
FIG. 1 is a graph illustrating a relationship between the product modulus using loose black and toluene photolometer of loose black.

In the production of furnace carbon blacks, as in the system of U.S. Pat. No. 2,564,700, which is incorporated herein by reference, process parameters (air-to-oil ratio, air-to-fuel ratio, type of feed or charge hydrocarbon, prequench locus, final quench locus, etc.) can be varied to produce a specific carbon black of certain desired properties. The methods of manufacturing various carbon blacks is well known by those in the art of making carbon blacks. Various typical physical properties for carbon blacks can be found in ASTM D 1765-76, listed by ASTM Designations, such as N110, N234, N330, etc. Among the physical properties for carbon black one property is referred to as structure (ASTM D 2414-76 and ASTM 3493-76). Structure of carbon black is attained or produced by selecting the proper feed hydrocarbon. Highly aromatic oils, or high Bureau of Mines Correlation Index oils, produce high structure furnace carbon blacks; the less aromatic oils produce low structure furnace carbon blacks, and by adding structure modifying chemicals, such as potassium compounds to the carbon black producing reaction, structure can be decreased, as is known to those skilled in the art.

Another important physical property of furnace carbon black is referred to as nitrogen surface area ($N_2SA$), as measured by ASTM D 3037-76. Nitrogen surface area is a measure of the total surface area of carbon black (reported as meters$^2$/gram) which total surface area includes area imparted to the particle by the "pitting" of the particle by excessive aftertreating. Surface area can be adjusted by adjusting air-to-oil ratio, among other process parameters.

Another important physical property of furnace carbon black is the Iodine Absorption Number as measured by ASTM D 1510-76. This value is reported in milligrams of iodine (using a standard iodine solution) adsorbed on a gram of carbon black, mg/gm. This value is in the same area of value of nitrogen surface area ($N_2SA$). Iodine number indicates the surface area of particle size of the carbon black particle, although it is affected by other factors including the "chemistry" of the surface of the particle. Iodine number is affected by air-to-oil ratio in the furnace carbon black reactor, the after-treatment such as prequench and quench, and the like.

Another physical property of a carbon black particle is the CTAB Surface Area, reported in meters$^2$/gram, as described in J. Janzen and G. Kraus, Rubber Chemistry and Technology, 44, 1287 (1971). The CTAB value represents the actual surface area of the particle but excluding the area caused by "pitting". Cetyltrimethylammonium bromide (CTAB) is used in determining this physical property, the pitting or micropores being too small to allow the CTAB molecule to enter.

The difference between $N_2SA$ and CTAB, or $N_2SA$-CTAB, gives a representation of the pitting or micropore area.

Another physical property is Tinting Strength as determined by ASTM D 3265-76. Tinting strength is affected by the carbon black surface area, structure, aggregate size distribution, and other factors, known to those skilled in the art.

Another property of carbon black is pH as determined by ASTM D 1512-75. Post-oxidation of the produced particle of carbon black, e.g., air charged to the downstream portion of the reactor, $HNO_3$ wet pelleting and drying, etc. decrease pH value of carbon black, as is known by those versed in this field.

An important physical property of carbon black is referred to as Photelometer Value, ASTM D 1618-75 "Carbon Black Extractables-Toluene Discoloration". High photelometer indicates low amounts of toluene extractables; low photelometer indicates high amount of toluene extractables on the carbon black. Photelometer is affected by, among other parameters, the quench locus in the carbon black reactor. Early quench or prequench produces relatively low photelometer values; later quench produces relatively high photelometer values. By selecting proper prequench and quench loci and rate, the desired photelometer value of the black can be obtained.

Instead of using toluene in ASTM D 1618-75, chloroform has also been used to determine chloroform extractables. Chloroform has a different solvency for the material on the carbon black than toluene solvency for these materials. In the chloroform "photelometer" test, two grams of dried, loose carbon black are added to 50 milliliters of chloroform in a beaker and are admixed about one minute, covered with a watch glass, and allowed to stand at room temperature (about 70° F.) for about five minutes. The mass is then filtered and the filtrate is measured for light transmitting as in ASTM D 1618-76. It has been empirically determined that $$\text{Toluene Photelometer} = \frac{28 \times \text{Chloroform Photelometer}}{128 - \text{Chloroform Photelometer}}$$

In the present invention any suitable means for producing furnace carbon black can be employed. During the pyrolysis reaction, i.e., the contacting of feed hydrocarbon with hot combustion gases, combustion products are formed which contain flocculent carbon black and gases. After a given amount of reaction time under a given set of reaction conditions, the combustion products are quenched, which will fix the physical properties of the loose carbon black and form an effluent. The combustion products are quenched, for example, by contact with a quench liquid such as water or with a quench fluid such as cooled reactor effluent or cooled off-gas from separating means (such as a bag filter) as is known in the art. The effluent is further cooled and loose or flocculent carbon black is recovered from the gases. The various test procedures listed above were used to test the physical properties of the carbon black, and data therefrom which relate to this invention are plotted on the six figures, referred to above. These tests include: chloroform photelometer of loose black; toluene photelometer of loose black, nitrogen surface area ($N_2SA$) of loose black, iodine number ($I_2$ No.) of loose black, structure (DBP 24M4) of loose black, and modulus value of loose black and pelleted black compounded with rubber (ASTM D 412-75).

Figure 6:
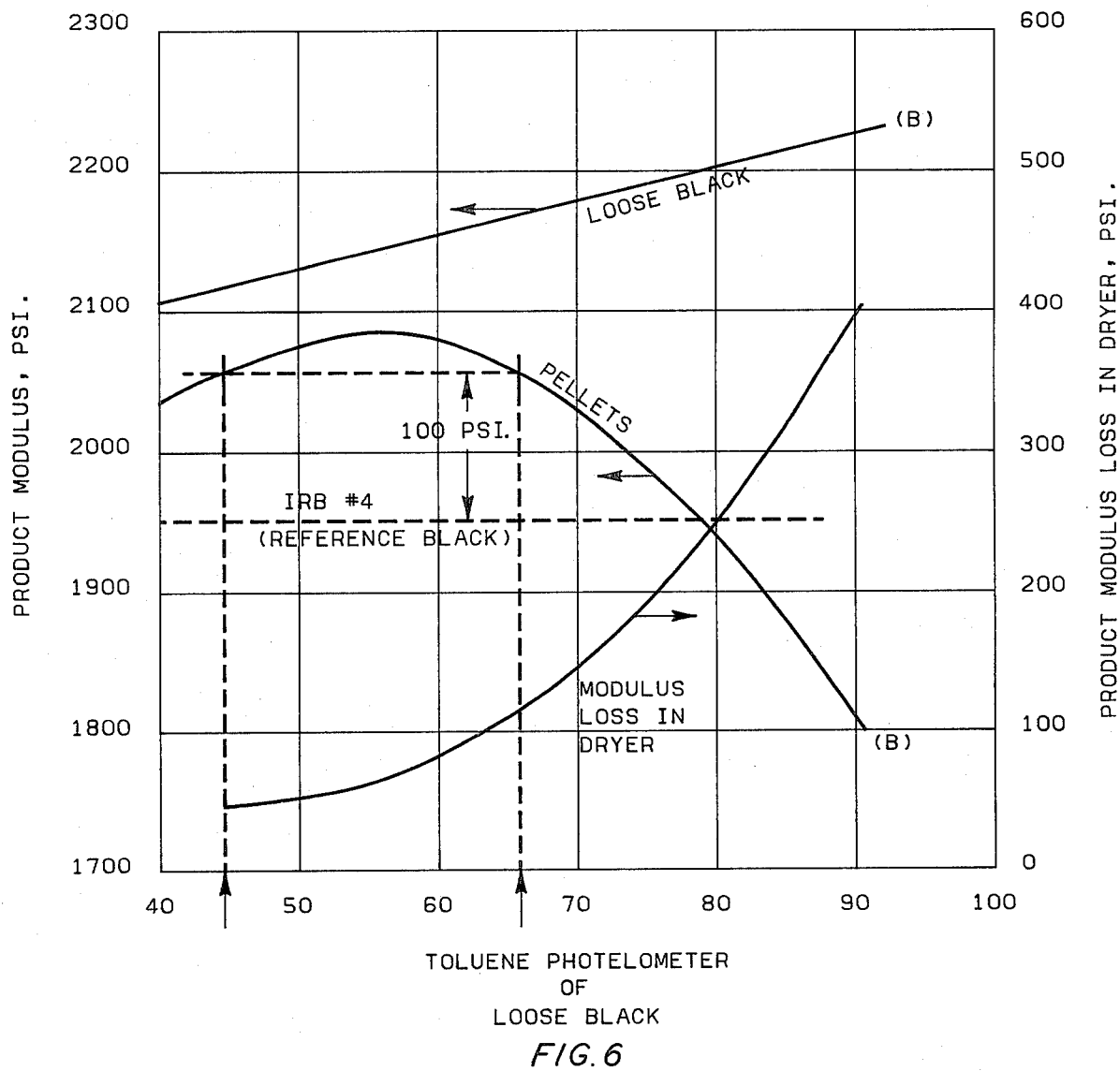
FIG. 6 is a graph illustrating a relationship between product modulus and loose black toluene photelometer and between product modulus loss in the dryer and toluene photelometer of loose black.

Obtaining a particulate carbon black (loose black) with a toluene photelometer of about 45 to about 65 which is the equivalent of a chloroform photelometer of about 75 to about 92 is the first step in minimizing the loss of product modulus. Photelometer can be controlled by selecting the location of the quench inlet(s) in the reactor and, the production of carbon black with a given photelometer is well known to those skilled in the art. See, for example, U.S. Pat. No. 3,307,911. Early or upstream quench produces lower photelometer values than later or downstream quench, as is known in the art. As best seen in FIG. 6, this is the peak portion of the curve for product modulus using pelleted carbon black. As herein used, product modulus is the modulus of the rubber in which the pelleted or loose carbon black is blended with the modulus being tested in accordance with ASTM D 412-75 in which an average of a 30 minute cure and 50 minute cure on a 300 percent modulus is used. The above range of photelometer values will produce a product modulus using wet pelleted, dried carbon black, which is at least about 100 psi above an Industrial Reference Black referred to IRB No. 4 reference black. After producing a flocculent or loose carbon black having the desired photelometer, the flocculent carbon black is pelleted in a pelleter such as that disclosed in U.S. Pat. No. 3,674,437, utilizing a process similar to that disclosed in U.S. Pat. No. 3,493,350, both of which disclosures are incorporated herein by reference.

In the pelleting process it is desirable to avoid the addition of pelleting additives or aids which can result in a loss of product modulus. However, minor amounts of such as calcium or sodium lignosulfonates can be added as a pelleting aid to the pellets without serious detrimental effects to the product modulus. Preferably the flocculent carbon black is pelleted using an aqueous pelleting liquid which is substantially if not entirely all water. After the carbon black is pelleted the pellets are dried in a dryer in accordance with a process and drying apparatus similar, except as noted below, to that disclosed in U.S. Pat. No. 3,168,350 which disclosure is incorporated herein by reference. The pelleted carbon black is dried using a purge gas from the dryer heating furnace with the purge gas being at a temperature below about 300° F. and preferably between about 250° F. and about 300° F. with the purge gas containing less than about 8 volume percent free oxygen and preferably between about 0 volume percent free oxygen and about 5 volume percent free oxygen. Such a drying method helps reduce product modulus loss.

Figure 5:
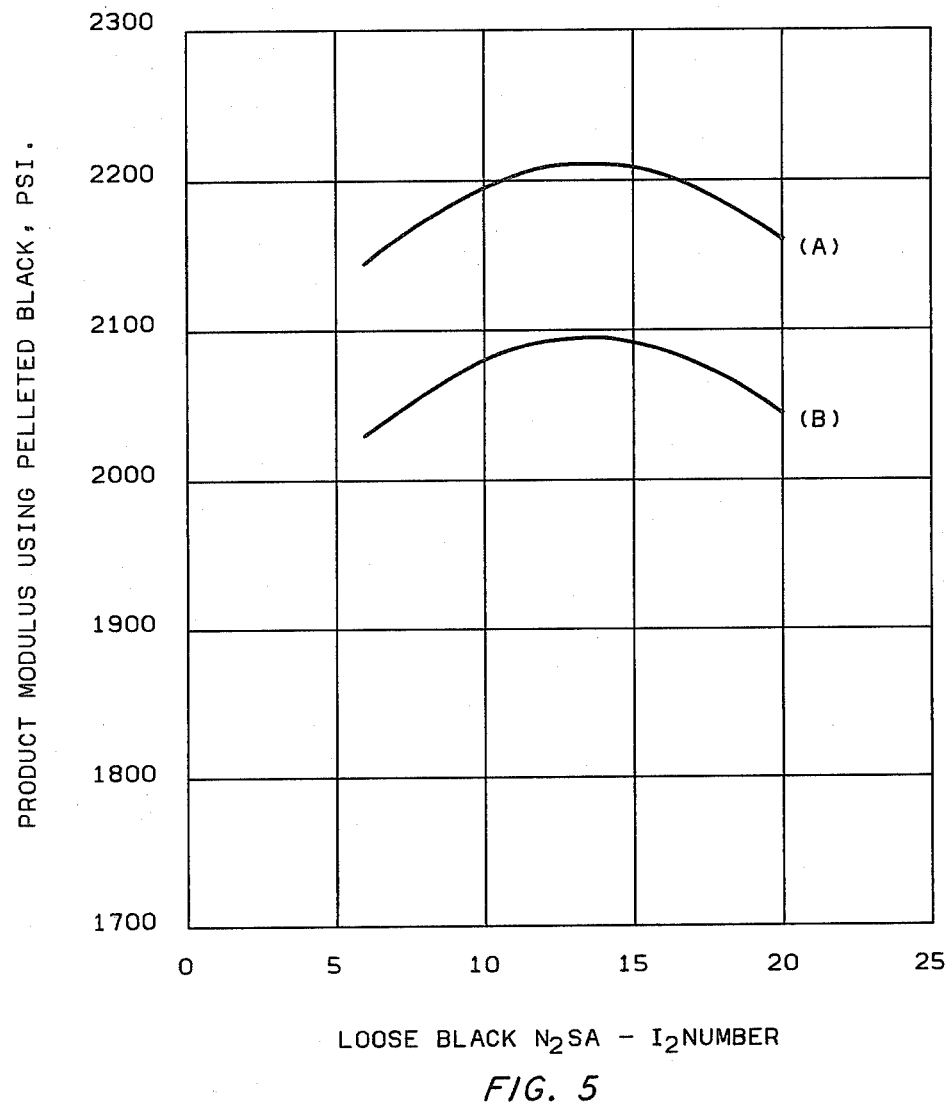
FIG. 5 is a graph illustrating a relationship of product modulus using pelleted black and the value of loose black $N_2SA-I_2$ number.

The flocculent carbon black produced in the reactor preferably is of the type which is referred to as a hard black which has an $N_2SA$ (nitrogen surface area) value of between about 75 and about 140 square meters per gram ($m^2/gm$). The desirable carbon black has an $N_2SA$ minus CTAB ($N_2SA$-CTAB) value of less than about 10 square meters per gram and an $N_2SA$ minus $I_2$ adsorption number ($N_2SA$-$I_2$) value between about 6 and about 20. FIG. 5 illustrates the importance of the desired range of the $N_2SA$-$I_2$ value, wherein the desired loose black toluene photelometer value range disclosed above corresponds to the desired range of the value of $N_2SA$-$I_2$.

Numerous experiments were conducted to determine the above desired ranges. Two carbon blacks were used and are identified as A and B on the graphs with black B being an ASTM D-234 type. Carbon black A had a CTAB value of 122 and a 24M4 DBP value of 108.5, while carbon black B had a CTAB of 118 and a 24M4 DBP value of 102. The 24M4 DBP value was tested in accordance with ASTM D 3493-76.

The experiments were conducted under the following conditions:

| | |
|---|---|
| (I) Process Variables, Ranges of Values for 25 Runs | |
| Total Tangential Air, SCF/hr., | 22,492 to 23,619 |
| Axial Air (for nozzle cooling), SCF/hr., | about 1000 |
| Tangential Gas (1000 Btu/SCF), SCF/hr. | 1,478 to 1,556 |
| Air Temperature, °F., | 600 to 730 |
| Feed Oil, Gal/hr., | 31.6 to 33.8 |
| Oil Boiling Range, °F., | about 600 to 1000 |
| BMCI | 126 |
| Density, 60° F., Lb/gal., | 8.95 |
| Oil Temperature, °F., | about 450 |
| Prequench Loci, inches,[a] | 14 to 30 |
| Water (100° F.) gal/hr., | 16.7 to 51.2 |
| Primary or Final Quench Locus, inches, | 60 |
| Water (100° F.), gal/hr. | 0 to 29.1 |
| (II) Carbon Black Product | |
| Carbon Black Yields, Lbs./gal., | 4.04 to 4.54 |
| Carbon Black Properties (unpelleted) | |
| Toluene Photelometer Range, | 33 to 86 |
| Chloroform Photelometer Range, | 71 to 98 |
| $I_2$ No., Milligrams/Gm, Range, | 89.6 to 132 |
| $N_2SA$, Meters$^2$/Gm, Range, | 117.8 to 142.9 |
| CTAB, Meters$^2$/Gram, Range | 116 to 132 |
| Tint, Range, | 120.8 to 127.4 |
| Carbon Black Properties, Wet Pelleted & Dried[b] | |
| Toluene Photelometer Range, | 24 to 100 |
| Chloroform Photelometer Range, | 75 to 99 |
| $I_2$ No., Milligrams/gram, Range, | 100 tp 146.3 |
| $N_2SA$, Meters$^2$/gram, Range, | 117 to 209.8 |
| CTAB, Meters$^2$/gram, Range, | 115.7 to 130.5 |
| Tints, Range, | 120.5 to 130.4 |
| 24M4 DBP, cc/100 gm, Range | 104.2 to 112.7 |
| Structure, DBP (not compressed) cc/100 Gm, Range, (ASTM D 2414-76) | 113.9 to 149.9 |
| (III) Apparatus Used For Producing Carbon Black | |
| (See U.S. 2,564,700) | |
| Precombustion Section | |
| Diameter, inches, | 15 |
| Length, inches, | 4 |
| Reactor Section (No Venturi) | |
| Length, inches, | 60 |
| Diameter, inches, | 4 |

[a] Measured from reactor conduit inlet or at downstream face of precombustion section or zone.
[b] Pelleted with water; and in some runs with water containing calcium lignosulfonate.

Flocculent carbon black was recovered from the filter at the rate of 140 pounds per hour and was wet pelleted, the pelleter having a 10 inch diameter by 48 inches length shell, with radial pins mounted helically on a rotating shaft using water alone and water plus up to 1.7 wt % calcium liqnosulfonate, at 100° F., RPM of the shaft was 400; "time of pelleting" about 3 minutes; water/carbon black ratio of 1 to 1 by weight.

DRYER

The continuous drying operation dryer was 18 inches in diameter, 12 ft. in length, and was operated at a temperature at 275° F., to result in 0.1 wt. % water on the dried pellets. The water content is preferably below about 0.5% by weight of the dried pellets. The purge gas had about 8 volume percent free oxygen and the drying time was 15 minutes to 20 minutes. About 280 pounds per hour of wet pellets were charged to the dryer.

CARBON BLACKS

Natural rubber was the rubber used in the recipe for the rubber-carbon black compound used for the modulus tests which were run in accordance with ASTM D 412-75.

The above experiments provided data which were subjected to regression analysis to provide the following formulas which were used to produce the curves on FIGS. 1–6. The following abbreviations are used in the equations:

(U) = Unpelleted Carbon Black (P) = Pelleted Carbon Black

Mod = Product Modulus

Tol = Toluene photelometer

Chl = Chloroform photelometer

Mod(U) = −3.22CTAB + 19.1×24M4DBP + 2.3Tol-(U) + 441

Mod Loss = −0.29CTAB − 5.1×24M4DBP + 0.217 Tol$^2$(U) − 21.8Tol(U) + 1153

Mod(P) = −2.93CTAB + 24.2×24M4DBP − 0.21-7Tol$^2$(U) + 24.1Tol(U) − 712

Mod(P) = −4.28CTAB + 20.06×24M4 − 1.17(N$_2$SA(U) − I$_2$NO(U))$^2$ + 31.54 (N$_2$SA(U) − I$_2$NO(U)) + 342.7

Tol = [28(Chl)]/(128-Chl) (conversion of chloroform to toluene photelometer)

Figure 2:
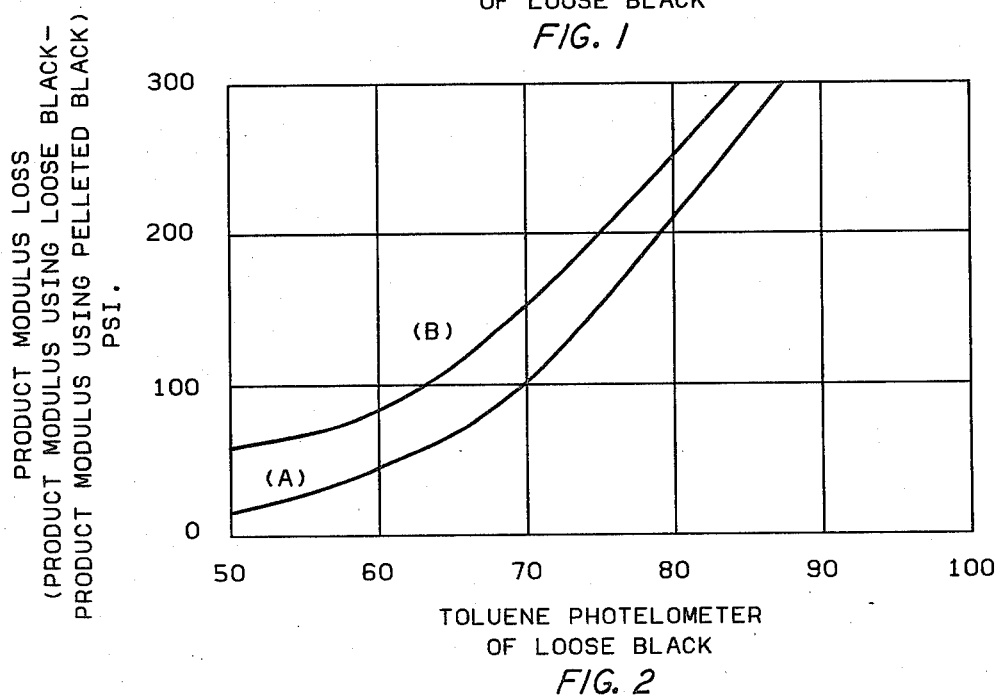
FIG. 2 is a graph illustrating a relationship between product modulus loss and loose black toluene photolometer.
Figure 3:
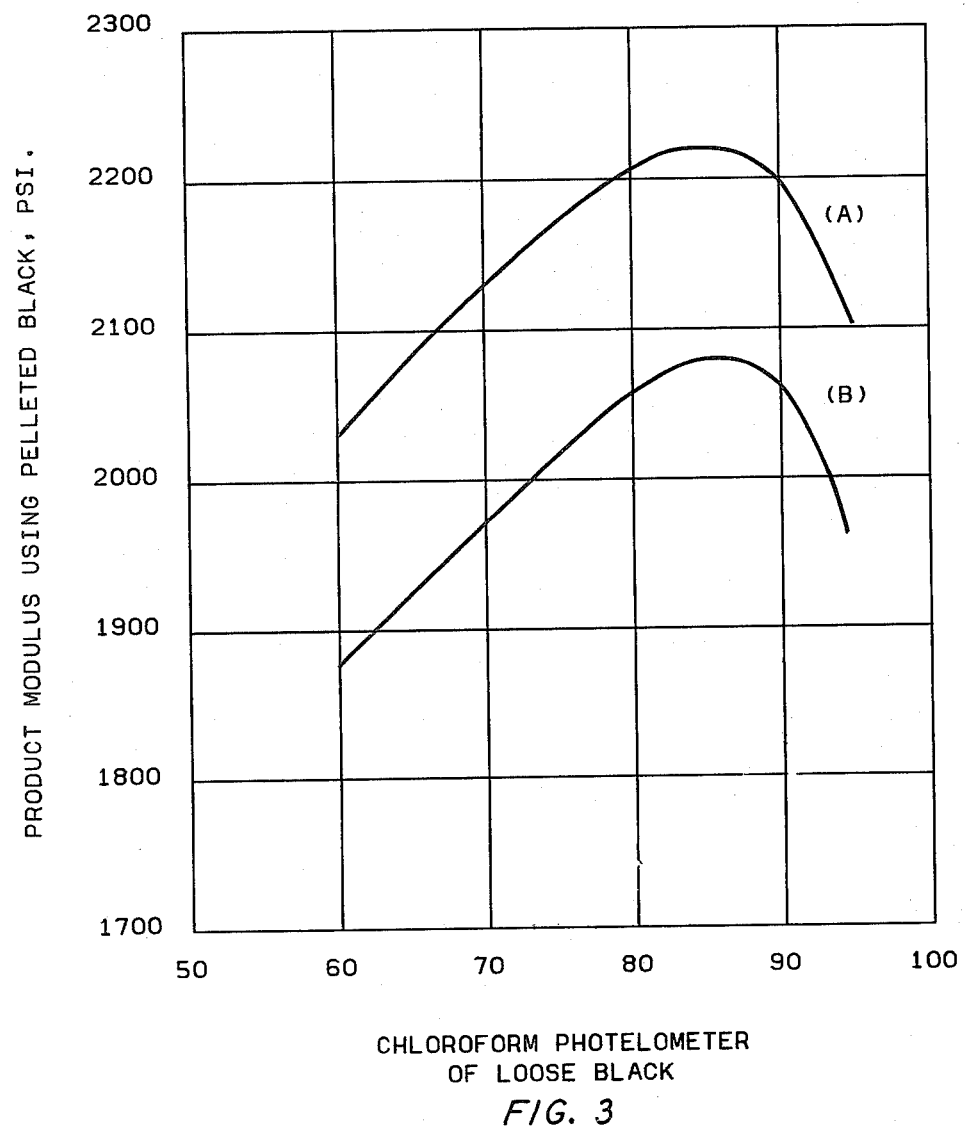
FIG. 3 is a graph illustrating a relationship between product modulus using pelleted black and loose black chloroform photolometer.
Figure 4:
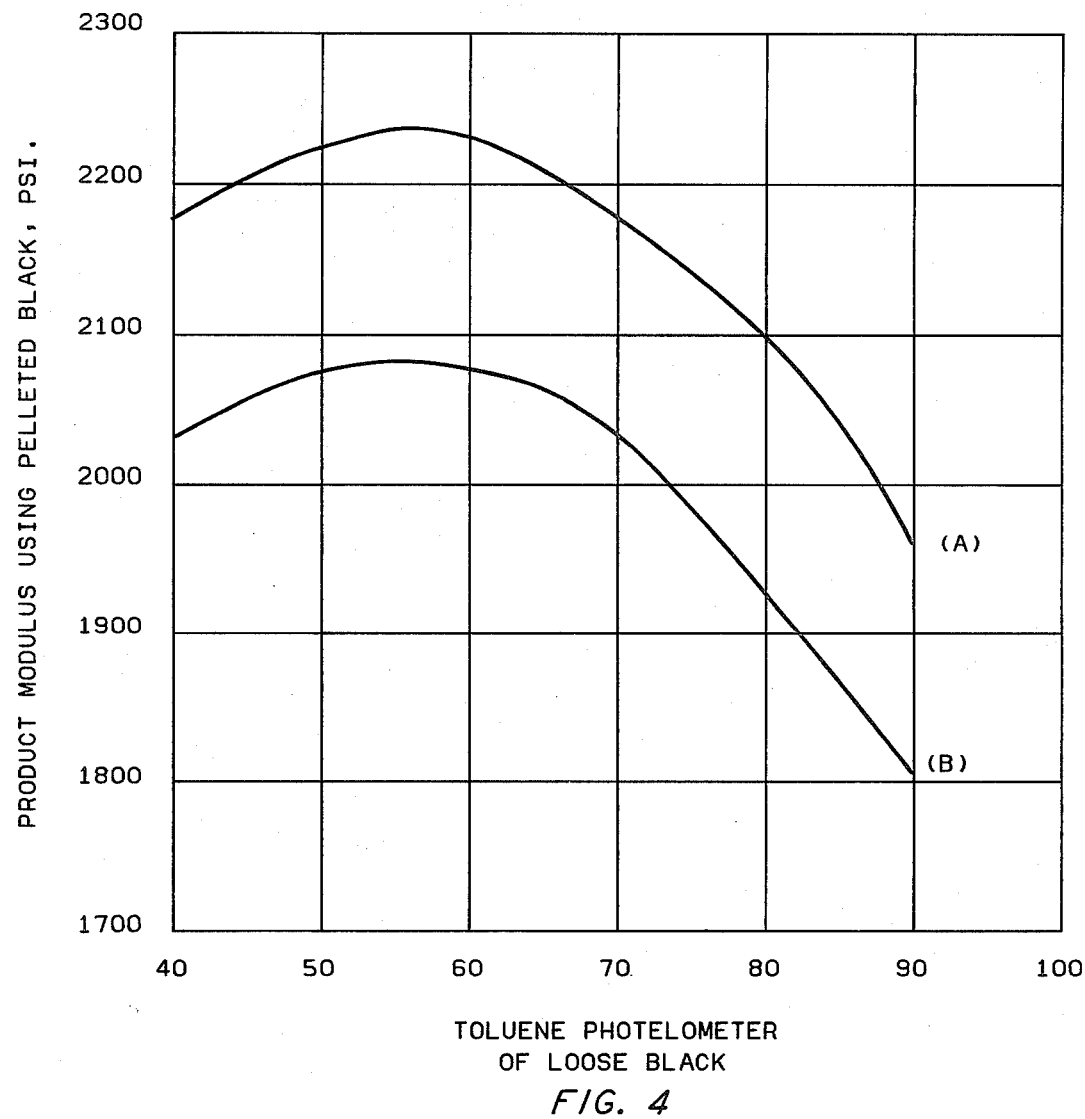
FIG. 4 is a graph illustrating a relationship between product modulus using pelleted black and loose black toluene photelometer.

FIG. 1 shows that the product modulus using loose black increases as the toluene photelometer value (and consequently the chloroform photelometer value) of the loose black increases. FIG. 2 shows that there is a loss of product modulus as the toluene photelometer value (and consequently the chloroform photelometer value) of loose black increases. It is noted that the loss of product modulus increases very rapidly with an increase in photelometer. The product modulus loss as used as one ordinate of FIG. 2 is the product modulus using loose black compounded into the rubber minus the product modulus using pelleted black compounded into the rubber. FIG. 3 shows that there is an optimum or maximum product modulus value when the rubber compound product is produced using pelleted black which has a loose black chloroform photelometer value at about 83 to 88. FIG. 4 is similar to FIG. 3 with the ordinates being toluene photelometer value of loose black instead of chloroform photelometer value and it likewise shows a maximum or optimum product modulus value using the pelleted black which has a loose black toluene photelometer value of about 52 to 62. FIG. 5 shows that the product modulus, for product formed with pelleted carbon black, at a function of the nitrogen surface area minus the iodine adsorption number of unpelleted black and that the product modulus has a maximum or optimum value at a N$_2$SA-I$_2$ number of about 12 to 15.

FIG. 6 is the most illustrative graph of the invention showing the importance of selecting a proper toluene photelometer value (e.g. about 57) of loose black to produce a product, using pelleted black, having a minimum loss of modulus. The top curve shows a linear relationship between product modulus using loose black and toluene photelometer value of loose black illustrating that the product modulus increases as the toluene photelometer value increases. However, the curve marked "pellets" shows that there is a maximum value of modulus obtainable when dried wet pelleted black is compounded with rubber wherein product modulus increases to (about 2075 psi) a maximum value at about 57 toluene photelometer value as measured on the loose black after which the product modulus (pelleted black in rubber) begins to decrease as the toluene photelometer value of the loose black increases. The curve marked "modulus loss in dryer" illustrates the difference between values on the "loose black" product modulus curve and the "pellet" product modulus curve showing how the product modulus loss effect in the dryer (pelleted black) increases with an increasing toluene photelometer value of loose black. A minimum loss of product modulus is accomplished by using a loose black having a toluene photelometer value of between about 45 and about 65. Above about 65 toluene photelometer value on loose black a sharp decrease in product modulus (that is rubber compounded with pelleted black) is realized as the toluene photelometer value of the loose black increases. Therefore, by proper selection of the particulate or loose carbon black photelometer value and by controlling the drying conditions and selecting carbon black having the above disclosed properties and by controlling the drying conditions used to dry the wet pelleted black a minimum loss of product modulus can be realized.

By minimizing the product modulus loss, rubbers can be compounded with improved properties. For example tire wear can be enhanced by minimizing product modulus loss. Also, better control of the production of carbon black pellets can be accomplished by correlating product modulus to controllable processing variables.

It is to be understood that while there has been illustrated and described certain forms of this invention, it is not to be limited to the specific embodiments herein described and shown except to the extent that such limitations are found in the claims.

What is claimed and desired to be secured by Letters Patent is:

1. A method of producing pelleted carbon black to reduce modulus loss comprising:

providing flocculent carbon black having a toluene photelometer of between about 45 and 65 or a chloroform photelometer of between about 78 and about 90, an N$_2$SA-CTAB value of less than about 10 m$^2$/gm, an N$_2$SA-I$_2$ adsorption number of between about 6 and about 20, and a nitrogen surface area of between about 75 m$^2$/gm and about 140 m$^2$/gm;

pelleting said flocculent carbon black using an aqueous pelleting liquid substantially free of additives to form carbon black pellets;

drying said carbon black pellets at a temperature of less than about 300° F. in an environment containing less than about 8 volume percent free oxygen; and recovering the thus dried pellets.

2. A method as set forth in claim 1 wherein:

said pellets are dried to a moisture content of less than about 0.5 percent by weight of the dried pellets.

* * * * *